Nov. 22, 1949  L. A. OTTERSON  2,488,554
AIRCRAFT LIQUID SPRAYER
Filed July 29, 1946

INVENTOR.
LEE A. OTTERSON
BY
*HIS ATTORNEYS*

Patented Nov. 22, 1949

2,488,554

UNITED STATES PATENT OFFICE 2,488,554

AIRCRAFT LIQUID SPRAYER

Lee A. Otterson, Willows, Calif.

Application July 29, 1946, Serial No. 686,835

6 Claims. (Cl. 244—136)

(Granted under the act of March 3, 1883, as amended April 30, 1928; 370 O. G. 757)

The invention described herein may be manufactured and used by or for the Government for governmental purposes without payment to me of any royalty thereon.

This invention relates to improvements in a propeller driven sprayer adapted to be mounted on an airplane for spraying liquid therefrom during flight.

An essential object of this invention is to provide an airborne propeller driven spraying device which is actuated by the slipstream induced by the flying airplane, and which device is efficient and is arranged and perfected so as to distribute the spray in a finely divided mist, even though the plane is traveling at a relatively low airplane speed.

Another object of this invention is to provide an airborne sprayer which is arranged as a self-contained unit, and can thus be mounted conveniently in various suitable locations and on suitable parts of the airplane and can likewise be readily detached therefrom.

Another object of this invention is to provide such a unitary sprayer which is so arranged and constructed that the active parts, as the fluid advancing and distributing section, can be readily disassembled from the stationary parts, as the fluid tank, so as to facilitate inspection and repair and at the same time provide a tight seal and prevent air from leaking into the liquid advancing portion of the device.

These and various other objects and advantages are attained with this invention as will become apparent from the following description, taken in connection with the accompanying drawing wherein the invention is shown in its preferred form, it being evident that other arrangements and forms of construction may be resorted to in carrying out the objects and purposes of this invention.

In the drawing:

Fig. 1 is a partial outline of an airplane showing my improved spraying device mounted thereon as a self-contained unit.

Fig. 2 is partly a side elevation and partly a vertical central sectional view of the unitary spraying device, parts being broken away.

This improved unitary spraying device is constructed as a complete self-contained unit so that it can be readily mounted on an airplane and can be readily detached therefrom. It consists essentially of a tank or container 5 for containing the material to be distributed, which is preferably in liquid form, a housing 6 mounted stationary but removably on the tank, a centrifugal pump and distributor assembly 7 rotatably carried by the housing and provided with orificed discharge means thereon, strainer-equipped passage means 8 to conduct liquid from the tank to said pump assembly and being provided with control valve means 9, and also propeller means 10 to drive the pump assembly by the force of the slipstream set up by the airplane during flight.

The tank 5 is preferably made substantially oval and has supporting means 12 provided thereon and connected by means 13 with a suitable part 14 on the airplane 15. Said tank has an opening 16 at the rearward end 17, providing access to its interior, and has a closure plate 18, in the form of a drumhead, mounted across said opening to close the same.

The housing 6 is mounted by flange means 21 and bolts 22 onto the end 17 of the tank, and it contains a forward cross-wall 23 and a rearward cross-wall 24. An antechamber 25 is provided between the forward cross-wall 23 and the drumhead 18.

The passage means 8 includes a supply conduit 26 between tank 5 and chamber 25, also a strainer 27 positioned in chamber 25 and detachably mounted on a nut 28, being removable with said nut. The liquid is thus strained as it enters this chamber, flowing through conduit 26, through a passage 29 and said nut 28. This strainer 27 is removable along with the nut 28 from said chamber for cleaning purposes after a threaded disc 30 is released from the housing wall beneath said nut and strainer.

The centrifugal pump and distributor assembly 7 comprises a hollow shaft 31 which functions as a tubular axle and is mounted by anti-friction bearings 32 rotatably in the walls 23 and 24 of the housing, so that the forward end of the shaft is in open communication with said chamber 25. The rearward end of said shaft 31 carries a hub 33 fixedly mounted thereon so as to rotate therewith, as by groove and spline means 34, and contains radial outlet channels 35 wherein tubular arms 36 are securely mounted to extend radially from the hub. The interiors or channels in said arms communicate with the interior of the tubular shaft, to receive the fluid from said chamber 25 through said shaft 31. Pressure sealing means 37 are mounted in said cross-walls 23 and 24 to prevent air from entering the chamber 25 and the fluid conducting shaft 31. An outlet element 38 with small apertures or orifices 39 therein is provided on the outer end of each tubular arm, so as to expel the fluid in small droplets and distribute them in a finely atomized spray.

The valve means 9 is connected to the conduit 26 and is spring-loaded so as to normally close the valve. Said valve is provided with a suction tube 41 extending from it to the lower end of the tank, and the valve is selectively openable, as by means of a cable or wire 42 extending from the valve actuating linkage 43 of said spring-closed valve means 9 to a conveniently accessible location in the airplane. A filler opening with a cap 44 thereon is provided at the upper part of the tank, and a drain opening with a plug 45 is provided at the bottom.

The means 10 for driving the pump assembly comprises a propeller head 46 fixedly secured to the rearward part of shaft 31 and hub 33, as by groove and spline means 47 and a nut 48. Said head 46 has propeller blades 49 fixed thereon which are actuated by the force of the airstream or slipstream set up by the associated airplane during flight.

When the control valve 9 is open during flight, the liquid or material is drawn through tube 41, conduit 26, passage 29, and screen 27 into chamber 25, and is then drawn through shaft 31 and forced out through radiating arms 36 by means of centrifugal force, being therefrom expelled through the many small apertures or orifices 39 on the outer ends of said arms. As the liquid is being forced out through these orifices 39 under the centrifugal force, it is struck by the high velocity airstream about the rotating arms and is thus distributed in a finely atomized spray or mist, even though the airplane is flying at a relatively low airplane speed. The tubular arms 36 mounted on the central hub 33 provide what may be termed a centrifugal distributor.

It is apparent from the foregoing description that this spraying device is readily mounted as a self-contained unit in an operative position on an airplane and can likewise be readily detached therefrom, that it is effective in distributing the spray in a finely divided mist, and that the pump assembly with its operating elements can also be readily removed from the tank for inspection and repair.

I claim:

1. A spraying device mountable on an airplane, comprising a liquid container having a removable wall member, a centrifugal pump and distributor assembly and means for removably mounting the same on the container against said removable wall member to facilitate removal therefrom for inspection and repair of both the container and said assembly, said assembly including a tubular shaft member and means mounting said shaft member for rotation about the longitudinal axis thereof, said tubular shaft member being in communication at one end with the interior of said container and being provided at the other end with a hollow centrifugal distributor having liquid outlet apertures disposed radially outwardly of said tubular shaft member for distributing liquid drawn through the shaft member in a fine spray from said apertures, and means for rotating said shaft member and distributor about said longitudinal axis of said shaft.

2. A spraying device mountable on an airplane, comprising a liquid container having a removable wall member at one end thereof, a centrifugal pump and distributor assembly, means for removably mounting said assembly against said wall member to facilitate removal therefrom for inspection and repair of both the container and said assembly, said assembly including a tubular shaft member in communication at one end with the interior of said container, a hollow centrifugal distributor rotatably mounted on said assembly and provided at the outer periphery thereof with liquid outlet apertures, said tubular shaft member being in communication at the other end thereof with the interior of said hollow distributor, and means for rotating said distributor member to draw liquid from said container through said tubular shaft member and to distribute said liquid in a fine spray from said apertures.

3. A spraying device mountable as a self-contained unit on an airplane, comprising a tank, a housing containing a pump assembly mounted therein and being detachably connected to said tank, a strainer equipped antechamber provided in said housing adjoining the tank, valve controlled conduit means connecting said tank and chamber, said assembly including a tubular shaft having one end opening into said chamber and having a hub secured at the other end, hollow arms extending from said hub and receiving liquid from said shaft, orificed outlet means on the outer ends of the arms, and a propeller connected with said hub and driven by the force of the slipstream of the airplane, whereby to distribute the liquid by centrifugal force and in a finely divided mist.

4. A spraying device mountable on an airplane, comprising a liquid container including a removable wall member, a centrifugal pump and distributor assembly and means for removably mounting it on the container against said wall member to facilitate removal therefrom for inspection and repair of both the container and the assembly, said assembly including a tubular member and means rotatably mounting it, said tubular member being at one end in communication with the container and provided at the other end with outwardly extending hollow members arranged for distributing liquid in a fine spray drawn through the tubular member, and means secured to the pump and distributor assembly for actuating it by the slipstream of the airplane during flight.

5. A spraying device mountable as a self-contained unit on an airplane, comprising a tank having at one end an opening and a closing plate removably mounted thereover to afford access into the tank, a housing removably mounted on the tank outward of said closing plate, an antechamber provided in said housing and provided with a screen-equipped passage connecting the tank and chamber, means for controlling the flow through said passage, a centrifugal pump and distributor assembly and means for rotatably mounting it in the housing in communication with said chamber, said assembly including a hollow shaft and a hub thereon provided with radially extending tubular arms having perforated outlet means on the outer ends, and a driving propeller removably secured to the hub and operated by the slipstream of the airplane in flight, whereby to draw the fluid by centrifugal force through the pump and distributor assembly and distribute it in a finely atomized mist.

6. A spraying device mountable as a self-contained unit on an airplane, comprising a tank having at one end an opening and a closing plate removably mounted thereover to afford access into the tank, a housing removably mounted on the tank outward of said closing plate to afford access into said housing, a crosswall in the housing, an antechamber provided in said housing between said crosswall and said plate and being provided with a screen-equipped passage connecting the tank and chamber, means for controlling the flow through said passage, a centrifugal pump and distributor assembly and means for rotatably mounting it in the housing in open communication with said chamber, said assembly including a hollow shaft and a hub thereon provided with radially extending tubular arms in communication with said shaft and having perforated outlet means in the outer ends, and a driving propeller removably secured to the hub and operated by the slipstream of the airplane in flight, whereby to draw the fluid by centrifugal force through the pump and distributor assembly and distribute it in a finely atomized mist.

LEE A. OTTERSON.

REFERENCES CITED

The following references are of record in the file of this patent:

UNITED STATES PATENTS

| Number | Name | Date |
| --- | --- | --- |
| 2,048,847 | Desmet | July 28, 1936 |
| 2,056,296 | Robertson | Oct. 6, 1936 |
| 2,399,265 | Sinton et al. | Apr. 30, 1946 |